US012632571B2

(12) United States Patent (10) Patent No.: US 12,632,571 B2

Pessl (45) Date of Patent: May 19, 2026

(54) MEMORY FOR GENERATING LATTICE-BASED SIGNATURE

(71) Applicant: Infineon Technologies AG, Neubiberg (DE)

(72) Inventor: Peter Pessl, Munich (DE)

(73) Assignee: Infineon Technologies AG, Neubiberg (DE)

( * ) Notice: Subject to any disclaimer, the term of this patent is extended or adjusted under 35 U.S.C. 154(b) by 212 days.

(21) Appl. No.: 18/534,928

(22) Filed: Dec. 11, 2023

(65) Prior Publication Data

US 2024/0249003 A1 Jul. 25, 2024

(51) Int. Cl.
 *G06F 21/60* (2013.01)
 *G06F 21/34* (2013.01)
 *G06F 21/64* (2013.01)

(52) U.S. Cl.
 CPC ............ *G06F 21/602* (2013.01); *G06F 21/34* (2013.01); *G06F 21/64* (2013.01)

(58) Field of Classification Search
 CPC ......... G06F 21/602; G06F 21/34; G06F 21/64

USPC .......................................................... 380/28
See application file for complete search history.

(56) References Cited

U.S. PATENT DOCUMENTS

2022/0012334 A1* 1/2022 Ghosh ..................... G06F 7/724
2024/0396740 A1* 11/2024 Del Pino .............. H04L 9/3247

FOREIGN PATENT DOCUMENTS

JP 2021150951 A * 9/2021

OTHER PUBLICATIONS

Oct. 6, 2023 (DE) Office Action—App. 102023101800.0.
Le, H., et al., "A Blind Signature From Module Latices," 2019 IEEE Conference on Dependable and Secure Computing, 8 pages, Nov. 2019.

* cited by examiner

*Primary Examiner* — Jacob Lipman
(74) *Attorney, Agent, or Firm* — Banner & Witcoff, Ltd.

(57) ABSTRACT

Generating a lattice-based signature includes: determining an uncorrected signature; determining hints based on a verification of the uncorrected signature, and providing the uncorrected signature and the hints as a lattice-based signature.

8 Claims, 4 Drawing Sheets

Fig.1

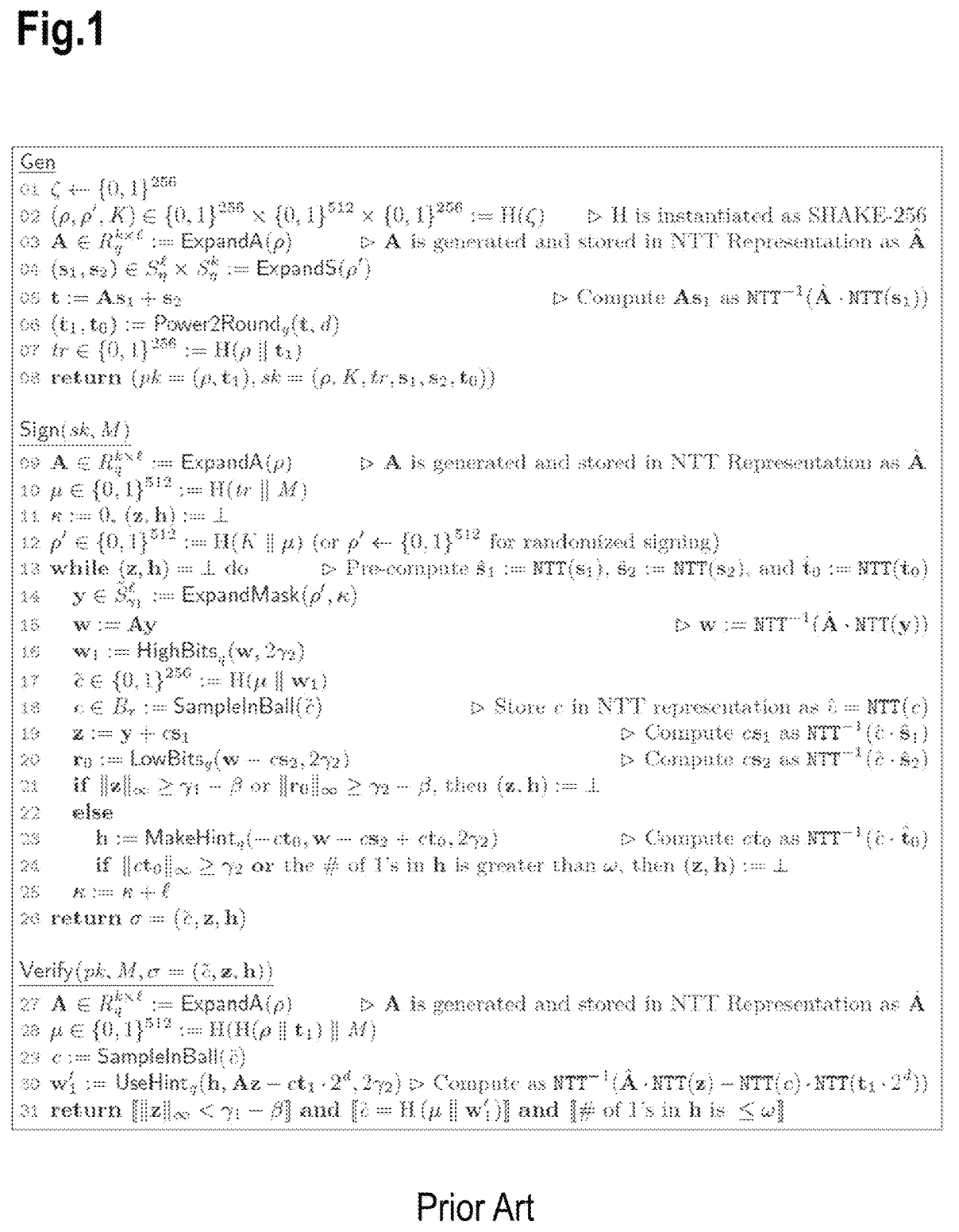

<u>Gen</u>

01 $\zeta \leftarrow \{0,1\}^{256}$

02 $(\rho, \rho', K) \in \{0,1\}^{256} \times \{0,1\}^{512} \times \{0,1\}^{256} := H(\zeta)$     ▷ H is instantiated as SHAKE-256

03 $\mathbf{A} \in R_q^{k \times \ell} := \text{ExpandA}(\rho)$     ▷ A is generated and stored in NTT Representation as $\hat{\mathbf{A}}$ 04 $(\mathbf{s}_1, \mathbf{s}_2) \in S_\eta^\ell \times S_\eta^k := \text{ExpandS}(\rho')$ 05 $\mathbf{t} := \mathbf{A}\mathbf{s}_1 + \mathbf{s}_2$     ▷ Compute $\mathbf{A}\mathbf{s}_1$ as $\text{NTT}^{-1}(\hat{\mathbf{A}} \cdot \text{NTT}(\mathbf{s}_1))$ 06 $(\mathbf{t}_1, \mathbf{t}_0) := \text{Power2Round}_q(\mathbf{t}, d)$ 07 $tr \in \{0,1\}^{256} := H(\rho \parallel \mathbf{t}_1)$ 08 return $(pk = (\rho, \mathbf{t}_1), sk = (\rho, K, tr, \mathbf{s}_1, \mathbf{s}_2, \mathbf{t}_0))$ <u>Sign$(sk, M)$</u>

09 $\mathbf{A} \in R_q^{k \times \ell} := \text{ExpandA}(\rho)$     ▷ A is generated and stored in NTT Representation as $\hat{\mathbf{A}}$ 10 $\mu \in \{0,1\}^{512} := H(tr \parallel M)$ 11 $\kappa := 0, (\mathbf{z}, \mathbf{h}) := \bot$ 12 $\rho' \in \{0,1\}^{512} := H(K \parallel \mu)$ (or $\rho' \leftarrow \{0,1\}^{512}$ for randomized signing)

13 while $(\mathbf{z}, \mathbf{h}) = \bot$ do     ▷ Pre-compute $\hat{\mathbf{s}}_1 := \text{NTT}(\mathbf{s}_1), \hat{\mathbf{s}}_2 := \text{NTT}(\mathbf{s}_2),$ and $\hat{\mathbf{t}}_0 := \text{NTT}(\mathbf{t}_0)$ 14     $\mathbf{y} \in \tilde{S}_{\gamma_1}^\ell := \text{ExpandMask}(\rho', \kappa)$ 15     $\mathbf{w} := \mathbf{A}\mathbf{y}$     ▷ $\mathbf{w} := \text{NTT}^{-1}(\hat{\mathbf{A}} \cdot \text{NTT}(\mathbf{y}))$ 16     $\mathbf{w}_1 := \text{HighBits}_q(\mathbf{w}, 2\gamma_2)$ 17     $\tilde{c} \in \{0,1\}^{256} := H(\mu \parallel \mathbf{w}_1)$ 18     $c \in B_\tau := \text{SampleInBall}(\tilde{c})$     ▷ Store $c$ in NTT representation as $\hat{c} = \text{NTT}(c)$ 19     $\mathbf{z} := \mathbf{y} + c\mathbf{s}_1$     ▷ Compute $c\mathbf{s}_1$ as $\text{NTT}^{-1}(\hat{c} \cdot \hat{\mathbf{s}}_1)$ 20     $\mathbf{r}_0 := \text{LowBits}_q(\mathbf{w} - c\mathbf{s}_2, 2\gamma_2)$     ▷ Compute $c\mathbf{s}_2$ as $\text{NTT}^{-1}(\hat{c} \cdot \hat{\mathbf{s}}_2)$ 21     if $\|\mathbf{z}\|_\infty \geq \gamma_1 - \beta$ or $\|\mathbf{r}_0\|_\infty \geq \gamma_2 - \beta$, then $(\mathbf{z}, \mathbf{h}) := \bot$ 22     else

23       $\mathbf{h} := \text{MakeHint}_q(-c\mathbf{t}_0, \mathbf{w} - c\mathbf{s}_2 + c\mathbf{t}_0, 2\gamma_2)$     ▷ Compute $c\mathbf{t}_0$ as $\text{NTT}^{-1}(\hat{c} \cdot \hat{\mathbf{t}}_0)$ 24       if $\|c\mathbf{t}_0\|_\infty \geq \gamma_2$ or the # of 1's in $\mathbf{h}$ is greater than $\omega$, then $(\mathbf{z}, \mathbf{h}) := \bot$ 25     $\kappa := \kappa + \ell$ 26 return $\sigma = (\tilde{c}, \mathbf{z}, \mathbf{h})$ <u>Verify$(pk, M, \sigma = (\tilde{c}, \mathbf{z}, \mathbf{h}))$</u>

27 $\mathbf{A} \in R_q^{k \times \ell} := \text{ExpandA}(\rho)$     ▷ A is generated and stored in NTT Representation as $\hat{\mathbf{A}}$ 28 $\mu \in \{0,1\}^{512} := H(H(\rho \parallel \mathbf{t}_1) \parallel M)$ 29 $c := \text{SampleInBall}(\tilde{c})$ 30 $\mathbf{w}_1' := \text{UseHint}_q(\mathbf{h}, \mathbf{A}\mathbf{z} - c\mathbf{t}_1 \cdot 2^d, 2\gamma_2)$ ▷ Compute as $\text{NTT}^{-1}(\hat{\mathbf{A}} \cdot \text{NTT}(\mathbf{z}) - \text{NTT}(c) \cdot \text{NTT}(\mathbf{t}_1 \cdot 2^d))$ 31 return $[\|\mathbf{z}\|_\infty < \gamma_1 - \beta]$ and $[\tilde{c} = H(\mu \parallel \mathbf{w}_1')]$ and $[\#$ of 1's in $\mathbf{h}$ is $\leq \omega]$ Prior Art

MEMORY FOR GENERATING
LATTICE-BASED SIGNATURE

BACKGROUND

In lattice-based cryptography, keys and ciphertexts and/or signatures are usually large, in particular, larger than their RSA/ECC counterparts.

A lattice-based signature algorithm utilizes a sender (also referred to as a signer) that conveys a signature to a receiver (also referred to as a verifier). The receiver has to be able to determine whether or not the signature is valid.

To decrease the size of the public key, the lattice-based digital signature scheme Dilithium [LDK+21] splits an uncompressed public key element t into two parts: A first portion $t_1$ contains the high-order bits of the coefficients of t and a second portion $t_0$ contains the low-order bits of the coefficients. Only $t_1$ is part of the public key, which decreases the required memory size compared to returning the uncompressed public key t.

However, for the returned signatures to be valid, the omission of $t_0$ in the public key needs to be taken into account during signing. During each signing operation, the effect caused by omitting $t_0$ is computed, and this effect is included in the signature. The verifier then uses so-called hints to correct the missing part $t_0$.

Computing the hints using the method described in the current Dilithium specification requires knowledge of $t_0$, which requires to $t_0$ be stored as part of the key. This could be a problem for devices with small memory since $t_0$ can be quite large (i.e., up to 3.25 kB). The public component $t_1$, though not directly required for signing, also needs to be stored on the device for several applications. For example, the device may have to transmit its public key (in the form of a signed certificate) to a verifier. Hence, with regard to the memory limitations, the signing device does not benefit from the public-key separation into $t_0$ and $t_1$.

SUMMARY

Hence, it is an objective to provide a more efficient way to save memory space when handling keys on a device.

This is solved according to the features of the independent claims. Further embodiments result from the depending claims.

The examples suggested herein may, in particular, be based on at least one of the following solutions. Combinations of the following features may be utilized to reach the desired result. The features of the method could be combined with any feature(s) of the device, apparatus, or system or vice versa.

It is noted that a cryptographic key may be used for any key used in a cryptographic context. It may, e.g., be any private, secure, or public key. The cryptographic key may, in particular, be a key used in combination with post-quantum cryptography.

A method is suggested for generating a lattice-based signature (σ) comprising
- determining an uncorrected signature (č,z),
- determining hints (h) based on a verification of the uncorrected signature (č,z),
- providing the uncorrected signature (č,z) and the hints (h) as lattice-based signature (σ).

Advantageously, the hints can be computed using a part of the public key, in the example described herein, the part $t_1$, instead of a part of the secret key $t_0$, which is larger than $t_1$. Hence, only the part $t_1$ needs to be stored locally on the device (but not $t_0$).

It is yet another advantage that all additional computations are conducted on public data, which results in a reduced security overhead.

Also, as verification is part of the signature generation, this solution can be used to detect faults or errors that may occur during the signing process.

Instead of computing the effects of omitting $t_0$ in the forward direction (using $t_0$ to compute the difference), the effects of omitting $t_0$ are computed in the backward direction: The uncorrected signature received is processed by the verification (using $t_1$). The observed difference between this outcome and intermediates computed during signing can be used to compute the hints h.

According to an embodiment, the signature generation is based on or interworks with the lattice-based digital signature scheme Dilithium.

According to an embodiment, the verification is based on a first portion ($t_1$) of an uncompressed public key element (t), wherein the second portion ($t_0$) of the uncompressed public key element (t) is not used during signature generation.

According to an embodiment, the second portion ($t_0$) of the uncompressed public key element is longer than the first portion ($t_1$) of the uncompressed public key element.

According to an embodiment, the second portion ($t_0$) of the uncompressed public key element is not stored locally.

Locally may, in particular, refer to a particular device. It can also be a device (or on several devices) which are connected via a network.

According to an embodiment, the second portion ($t_0$) of the uncompressed public key element is not made publicly available.

According to an embodiment, the verification is used to determine whether a fault has occurred during the generation of the lattice-based signature.

According to an embodiment, the compression function is at least partly conducted on one of the following:
- a security device,
- a secured cloud,
- a secured service,
- an integrated circuit,
- a hardware security module,
- a trusted platform module,
- a crypto unit.
- a field programmable gate array (FPGA),
- a processing unit,
- a controller, and
- a smart card.

Also, a device is provided for generating a lattice-based signature (σ), wherein the device is arranged to execute the following steps:
- determining an uncorrected signature (č,z),
- determining hints (h) based on a verification of the uncorrected signature (č,z),
- providing the uncorrected signature (č,z) and the hints (h) as lattice-based signature (σ).

According to an embodiment, the device is one of the following or comprises at least one of the following:
- a security device,
- a secured cloud,
- a secured service,
- an integrated circuit,
- a hardware security module,
- a trusted platform module, a crypto unit, a field programmable gate array (FPGA), a processing unit, a controller, and a smart card.

Further, a computer program product is provided, which is directly loadable into a memory of a digital processing device, comprising software code portions for performing the steps of the method as described herein.

BRIEF DESCRIPTION OF THE FIGURES

Embodiments are shown and illustrated with reference to the drawings. The drawings serve to illustrate the basic principle so that only aspects necessary for understanding the basic principle are illustrated. The drawings are not to scale. In the drawings, the same reference characters denote like features.

FIG. 1 shows a pseudo-code taken from [LDK+21] for deterministic and randomized versions of Dilithium.

DETAILED DESCRIPTION

Figure 2:
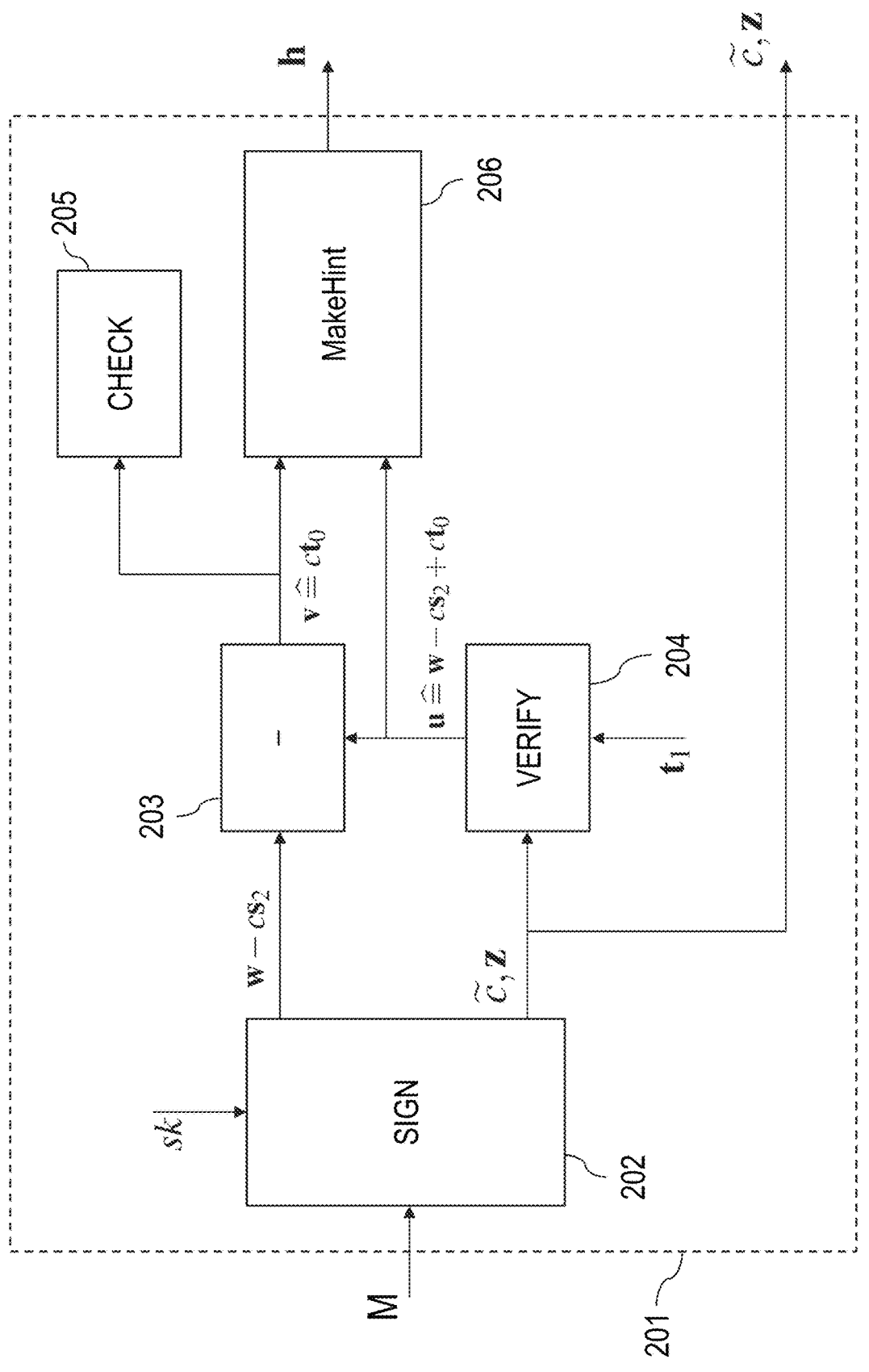
FIG. 2 shows an exemplary block diagram of a modified signature procedure that can, in particular, be used in a Dilithium environment.

The examples described herein allow for an efficient computation of the hints using the public key $t_1$ instead of $t_0$. Hence, $t_1$ is stored locally on a device, but not $t_0$. This is advantageous because $t_1$ is required for verification purposes anyway.

It is also an advantage that all added computations are conducted on public data, which results in a reduced security overhead. Also, the approach can be used for fault detection purposes.

Instead of computing the effects of omitting $t_0$ in the forward direction (using $t_0$ to compute the difference), the effects of omitting $t_0$ are computed in the backward direction: The uncorrected signature received is processed by parts of the verification process (using $t_1$). The observed difference between this outcome and intermediates computed during signing can then be used to compute the hints that allow correcting the signature.

Introduction to Dilithium

Hereinafter, a brief and simplified description of the involved parts of the Dilithium signature scheme is provided. For more details, reference is made to [LDK+21].

Dilithium operates on vectors and matrices comprising polynomials with coefficients modulo q. Polynomials are denoted using plain letters, e.g., a, whereas vectors and matrices are denoted by bold lowercase a and uppercase A letters, respectively.

FIG. 1 shows a pseudo-code taken from [LDK+21], page 13, for deterministic and randomized versions of Dilithium.

This pseudo-code comprises three sections: a key generation portion, a sign (signature generation) portion, and a verify portion. These will be described next with reference to the line numbers, as shown in FIG. 1.

Dilithium: Key Generation

Line 1: A random number $\zeta$ is generated. This number serves as a seed for the key generation.

Line 2: Three further seeds ($\rho, \rho', K$) are derived from the random number $\zeta$.

Line 3: The seed $\rho$ is used to deterministically generate (function ExpandA) a matrix A. The seed $\rho$ is also included in the public and private keys so that all participants can generate the matrix A.

Line 4: A function ExpandS is used to derive secret key elements ($s_1, s_2$) from the seed $\rho'$. The coefficients of ($s_1, s_2$) are uniformly distributed across an interval $[-\eta, \eta]$.

Line 5: An uncompressed public key element t is computed by multiplying the matrix A with the first secret key element $s_1$ and then adding the second secret key element $s_2$.

Line 6: The uncompressed public key element t is split into two parts $t_1$ and $t_0$ using a function Power2Round. The element $t_1$ contains the higher-order bits of the coefficients of the uncompressed public key element t, and the element $t_0$ contains the lower-order bits of the coefficients of the uncompressed public key element t.

Line 7: The seed $\rho$ and the compressed public key element $t_1$ are hashed to a value tr.

Line 8: A public key pk is provided, which comprises the seed $\rho$ and the element $t_1$.

A secret key sk comprises the seeds $\rho$ and K, the hash value tr of the public key, the secret key elements $s_1$ and $s_2$, and the lower-order bits $t_0$ of the uncompressed public key element t.

It is noted that $\rho$, tr, and $t_0$ are required for signing and are therefore included in the private key, but they do not need to be kept secret and can be revealed. On the other hand, K, $s_1$, and $s_2$ need to be kept secret.

Dilithium Sign(ature Generation)

Line 9: The matrix A is determined based on the seed $\rho$, which is included in the secret key sk.

Line 10: The hash value tr of the public key is hashed together with a message M, which is to be signed. The result is stored in $\mu$.

Line 11: A counter variable K is initialized to 0. Signature output elements (z,h) are initialized to the invalid symbol $\perp$.

Line 12: The seed $\rho'$ is determined: If deterministic signing is used, $\rho'$ is derived as the hash of the secret value K together with the value $\mu$. If randomized signing is used, $\rho'$ is set to a random number.

Line 13: Start of rejection loop: As long as no valid signature is found (i.e., while (z,h) is set to the invalid signal $\perp$), Dilithium keeps restarting the signing (starting from this line).

Line 14: A value $\gamma$ is derived in a deterministic manner utilizing a function ExpandMask, which uses the seed $\rho'$ and the counter $\kappa$. The value $\gamma$ follows a distribution $\tilde{S}_{\gamma 1}$, i.e., the coefficients are uniformly distributed in an interval determined by the parameter $\gamma_1$.

Line 15: A vector w is determined by multiplying the matrix A with the value $\gamma$.

Line 16: A function HighBits decomposes each coefficient of the vector w (such that, for each coefficient x, $x = x_1 \alpha + x_0$) and returns a higher-order value $w_1$. The value of $\alpha$ is set to $2_{\gamma 2}$ the specific value of which is defined in the parameter set.

Line 17: This value $w_1$ is hashed together with $\mu$ resulting in a hash value $\tilde{c}$.

Line 18: A function SampleInBall turns the hash value $\tilde{c}$ into a polynomial c for which the values of the coefficients have a certain distribution.

Line 19: The output value s is computed based on $\gamma$, c, and $s_1$.

Line 20: A value $w-cs_2$ is computed and decomposed, and the lower bits are returned as $r_0$.

Line 21: Each coefficient of z and $r_0$ is checked and tested if it falls in a certain range, i.e., if $$\|z\|_\infty \geq \gamma_1 - \beta$$

is true, then at least one coefficient of z falls outside the open interval $(-(\gamma_1, -\beta), (\gamma_1, -\beta))$. If this is the case for either z or $r_0$ (for their respective range parameters), the signature output (z,h) is set to invalid $\perp$ and the loop starting at line 13 enters another iteration.

Line 22: "else" refers to the case that all coefficients of z and $r_0$ fall within the specified respective range. In this case, signature generation continues in line 23:

Line 23: Run a function MakeHint, which computes the effect of omitting $t_0$ from the public key (cf. Equation (2)), resulting in a so-called hints vector h. This hints vector h describes for each coefficient if this omission causes an incorrect recovery of HighBits($w-cs_2$) during verification. These incorrectly recovered coefficients are then corrected in the verification procedure.

Line 24: This line includes two further checks, both are needed to verify that the error induced by omitting $t_0$ from the public key can later be corrected during verification.

First, if the value of $ct_0$ exceeds a predefined threshold (i.e., becomes too large) at any coefficient, the functions MakeHint and UseHint are no longer capable of correcting the error, meaning that the current signature needs to be rejected.

Second, the vector h is encoded such that up to $\omega$ coefficients of $$\text{High Bits} (w - cs_2)$$

can be corrected during verification. If this number is exceeded, i.e., more than w coefficients need to be corrected, this information cannot be properly encoded anymore, and thus the errors cannot be corrected during verification. Hence, the current signature needs to be rejected.

If the checks show that the signature needs to be rejected, then the signature output (z,h) is set to invalid $\perp$, resulting in another iteration of the loop starting in line 13.

Line 25: In the (potentially needed) next iteration of the rejection loop starting in line 13, fresh values for $\gamma$ need to be generated. This is achieved by increasing the counter $\kappa$. This is done regardless of whether another iteration is needed (which is the case if (z,h)=$\perp$).

Line 26: The signature $\sigma$, comprising $\check{c}$, z and h is returned.

Dilithium: Verify

Line 27: The matrix A is determined based on the seed $\rho$, which is included in the public key pk.

Line 28: Reference is made to line 10 above. However, the hash value tr is recomputed tr=H($\rho\|t_1$), because it is not part of the public key.

Line 29: This line corresponds to line 18, i.e., the hash value $\check{c}$ is deterministically converted to a polynomial c whose coefficients follow a specific distribution.

6

Line 30: First, $Az - ct_1 \cdot 2^d$ is computed (cf. Equation (2)). The function UseHints then uses the hints vector h to correct the error caused by omitting $t_0$ from the public key and ensures that the output $$w_1'$$

equals the value of $w_1$ computed during signing (line 16).

Line 31: Three tests are performed to check the validity of the signature: The first and third tests ensure that the signer has performed the rejection steps. The second test verifies the validity of the signature. It computes $$H(\mu \| w_1'):$$

this value must be identical to the value $\check{c}$ which was included in the signature (cf. line 17 of signing).

If the full vector t was included in the public key, the verifier could compute $$Az - ct = A(y - cs_1) + c(As_1 + s_2) = Ay + Acs_1 - Acs_1 - cs_2 = w - cs_2 \quad (1)$$

Checks (or tests) performed during the signing portion ensure that the following applies:

$$\text{High Bits} (w) = \text{High Bits} (w - cs_2) = w_1.$$

The verifier can thus recompute $$\check{c} = H(\mu \| w_1)$$

and the verifier can determine if this $\check{c}$ matches the signature as provided.

As explained with regard to the Dilithium implementation above, only the portion $t_1$ (instead of the full vector t) is supplied to the verifier, which then actually computes (see line 30 of the pseudo-code shown in FIG. 1)

$$Az - ct_1 \cdot 2^d = A(y + cs_1) - c(t - t_0) = w - cs_2 + ct_0. \quad (2)$$

| Algorithm 1 MakeHint (simplified) |
|---|
| Input: "large" input r, "small" input z |
| 1: $r_1 := \text{HighBits}(r)$ |
| 2: $v_1 := \text{HighBits}(r+z)$ |
| 3: if $r_1 \neq v_1$ then return 1 |
| 4: else return 0· |

To correct the added term $ct_0$, the signer computes hints h, which represent the effect of this addition, and the signer includes these hints in the signature. Actually, the hints describe if the addition of $ct_0$ causes a carry to ripple into the HighBits of $w-cs_2$ (see Algorithm 1, which is computed for each coefficient). Using the hints, the verifier can subtract the carry from the coefficients and thereby recover the correct $$\text{High Bits } (w - cs_2) = w_1. \qquad 5$$

In the existing Dilithium approach, computing the hints requires the portion $t_0$ of the public key t.

Improvements Over Existing Solutions

The examples described herein do not require storing the vector $t_0$ as part of the secret key.

In an exemplary embodiment, a (potential) signature output (z,c) is fed to a verification algorithm, which uses the vector $t_1$ to compute $$w - cs_2 + ct_0$$

(see Equation (2)). This term is then compared to $$w - cs_2, \qquad 25$$

which is computed during signing. By comparing the High-Bits of these two terms, the hints h can be computed.

An exemplary implementation of a modified signature generation may comprise the following steps:

(1) Generate a valid signature (z,c), i.e., run all steps of the Dilithium sign algorithm except for line 23. However, keep the interim value $w\text{-}cs_2$.

(2) Compute part of the verification algorithm using $t_1$:

$$u := Az - ct_1 \cdot 2^d = w - cs_2 + ct_0.$$

(3) Recover $ct_0$:

$$v := ct_0 = \left(Az - ct_1 \cdot 2^d\right) - (w - cs_2) =$$
$$= u - (w - cs_2)$$

(4) Compute the hints h:

$$h = MakeHint(-ct_0, w - cs_2 + ct_0) =$$
$$= MakeHint(-v, u).$$

These steps are part of Algorithm 2, which shows a modified Dilithium signing algorithm by replacing line 23 of FIG. 1 with lines 16 to 18 of Algorithm 2.

Since the function MakeHint computes the sum of its two operands (when implemented according to the Dilithium specification or the simplified Algorithm 1), running $$MakeHint(-v, u)$$

corresponds to computing $$HighBits(x)( = HighBits(w - cs_2))$$
$$\text{and } HighBits(u)( = HighBits(w - cs_2 + ct_0))$$

and comparing the results for equality (see Algorithm 1).

The hints h are set to 1 for coefficients where the results differ, and to 0 if they are equal. However, the variable v still needs to be computed to enable the check of $\|v\|\infty$.

FIG. 2 shows an exemplary block diagram of the modified signature according to Algorithm 2, which is summarized within the dashed block 201. A message M is fed to a block 202, which conducts the sign operation according to lines 1 to 15 of

---

Algorithm 2 Dilithium Sign (modified)

Input: Message M, private key sk = $(\rho, K, tr, s_1, s_2, t_0)$
Output: Signature $\sigma = (\tilde{c}, z, h)$
1:  $A \in R_q^{k \times \ell} := ExpandA(\rho)$
2:  $\mu \in \{0,1\}^{512} := H(tr \| M)$
3:  $\kappa := 0, (z,h) := \perp$
4:  $\rho' \in \{0,1\}^{512} := H(K \| \mu)$ (or $\rho' \leftarrow \{0,1\}^{512}$ for randomized signing)
5:  while $(z,h) = \perp$ do
6:      $y \in \tilde{S}_{\gamma l}\ell := ExpandMask(\rho', \kappa)$
7:      $w := Ay$
8:      $w_1 := HighBits_q(w, 2\gamma_2)$
9:      $\tilde{c} \in \{0,1\}^{256} := H(\mu \| w_1)$
10:     $c \in B_\tau := SampleInBall(\tilde{c})$
11:     $z := y + cs_1$
12:     $r_0 := LowBits_q(w - cs_2, 2\gamma_2)$
13:     if $\|z\|_\infty \geq \gamma_1 - \beta$ or $\|r_0\|_\infty \geq \gamma_2 - \beta$ then
14:         $(z,h) := \perp$
15:     else
16:         $u := Az - ct_1 \cdot 2^d$          $\triangleright u \triangleq w - cs_2 + ct_0$, cf. Equation (2)
17:         $v := u - (w - cs_2)$          $\triangleright v \triangleq ct_0$
18:         $h := MakeHint_q(-v, u)$          $\triangleright$ equivalent to $MakeHint_q(-ct_0, w - cs_2 + ct_0)$
19:         if $\|v\|_\infty \geq \gamma_2$ or the # of 1's in h is greater than $\omega$ then $(z,h) = \perp$
20:     end if
21:     $\kappa := \kappa + \ell$
22: end while
23: return $\sigma = (\tilde{c}, z, h)$ Algorithm 2 utilizing the private key sk.

A result $w\text{-}cs_2$ is conveyed from block 202 to block 203. The hash value $\tilde{c}$ and the output value $z$ are also determined by block 202 and are conveyed to block 204 as well as supplied as part of the signature $\sigma$.

Block 204 conducts a verification according to line 16 of Algorithm 2 based on the portion $t_1$ of the public key t. Further, block 204 outputs $$u = w - cs_2 + ct_0$$

according to Equation (2)) to the block 203 and to a block 206.

Block 203 computes a difference between the input from block 204 and block 202, i.e., $$u - (w - cs_2) = w - cs_2 + ct_0 - (w - cs_2) = ct_0,$$

which equals $v$ and corresponds to line 17 of Algorithm 2. This vector $v$ is supplied to block 206 and to block 205.

Block 205 conducts a check operation of $$v = ct_0$$

according to line 19 of Algorithm 2, which may result in a restart of the loop, as explained above.

Block 206 calculates the hints $h$ according to line 18 of Algorithm 2 utilizing the function MakeHintq based on the inputs $-v$ and $u$.

Hence, at the output of block 201, the signature $$\sigma = (\tilde{c}, z, h)$$

of the Message M is available.

Integrated Sign-then-Verify Countermeasure

Although not the full verification is computed in this modified sign procedure, it allows an advantageous way of including a sign-then-verify fault countermeasure, which reveals faults that might have been inserted during the sign procedure.

The difference between $$HighBits(w - cs_2)$$

$$\text{and } HighBits(w - cs_2 + ct_0)$$

must not exceed 1 (in absolute value) for each coefficient. Since the magnitude of $ct_0$ lies within a certain range (this is verified in line 24 of FIG. 1), adding $ct_0$ to any other value x will never result in a larger difference in the functions HighBits(x) and HighBits(x+ct_0).

The current solution does not compute the quantity $$w - cs_2 + ct_0$$

by adding $ct_0$ to $w\text{-}cs_2$, but instead by evaluating a portion of the verification procedure. If, e.g., a fault is injected in the computation $w=Ay$ during signing, then the corrupted $w\text{-}cs_2$ will likely significantly differ from $u:=Az\text{-}ct_1\cdot2^d$ (which is equivalent to $w\text{-}cs_2+ct_0$ in the undisturbed case). Thus, by testing if the difference between $HighBits(w\text{-}cs_2)$ and $HighBits(u)$ is at most one, certain faults can be detected.

Further Embodiments and Advantages

The solution presented allows a significant reduction of memory space, which allows existing memory to be used for other purposes. A device supporting both signing and verification for a keypair may, therefore, advantageously only store the vector $t_1$ instead of both vectors $t_1$ and $t_0$, allowing savings of up to 3.25 kB per key. A device merely supporting signing for a keypair also benefits because $t_1$ can be stored instead of $t_0$, and $t_1$ requires less memory space than $t_0$.

Another advantage is that the approach presented has built-in fault detection capability (if required).

It is also an advantage that the solution operates on public data (public key, signature output), which may not require additional security measures like side-channel protection.

While the computation is part of the rejection loop and certain conditions require restart signing (see [LDK+21] for details), the conditions are checked last and are thus unlikely to fail. Hence, the additional computations suggested in the modified sign procedure are likely to be computed only once.

The current reference implementation of Dilithium suggests a function MakeHint that uses $$w_0 - cs_2 - ct_0 \text{ and } w_1$$

as input. In this case, $ct_0$ can be recovered first before computing $$r_0 - ct_0 = w_0 - cs_2 - ct_0.$$

The following refers to further examples of processing devices that can be used to implement the invention as described herein.

Figure 3:
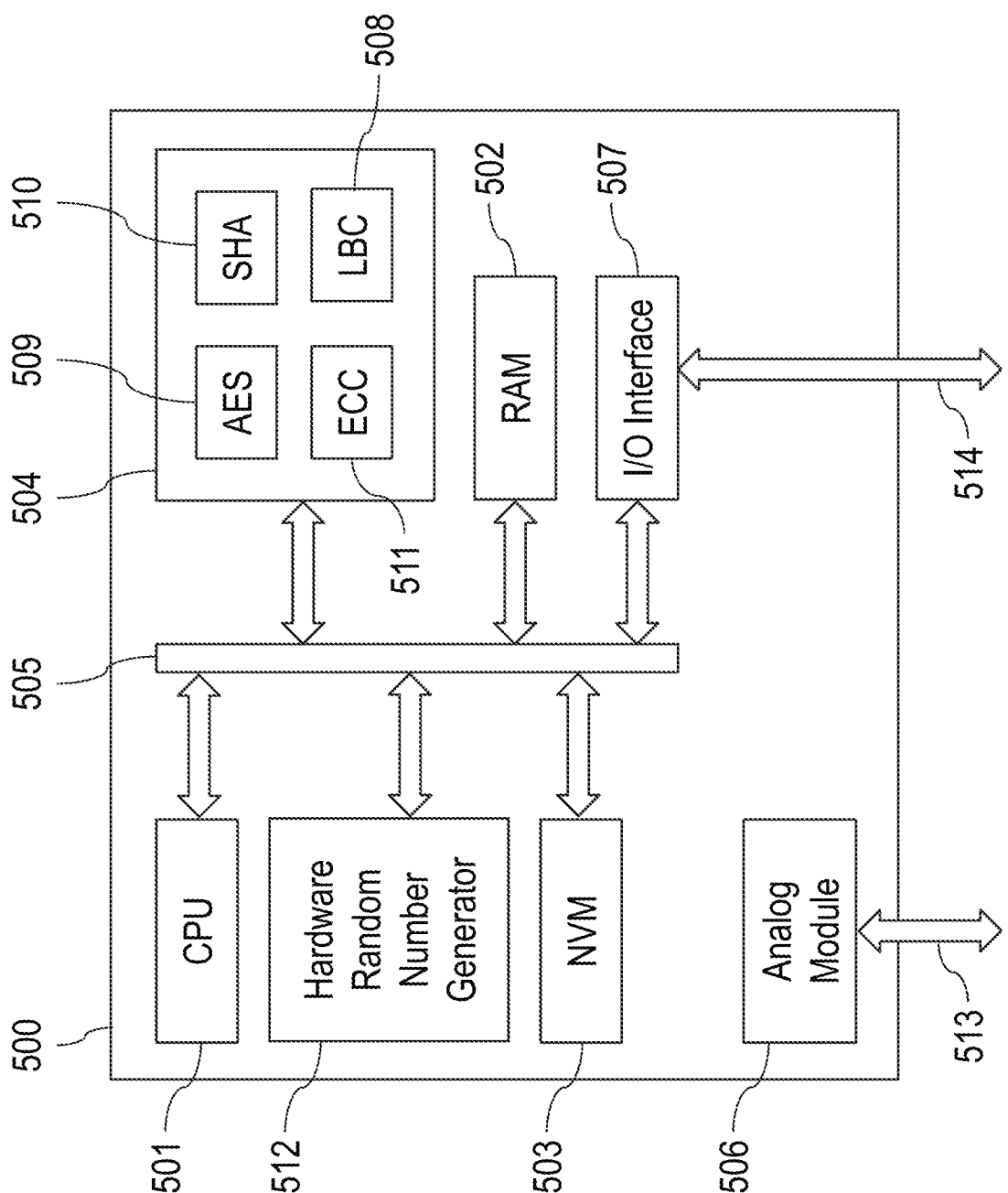
FIG. 3 shows an exemplary arrangement of a processing device comprising a CPU, RAM, non-volatile memory, a crypto module, an analog module, an input/output interface, and a hardware-random number generator.

FIG. 3 shows a processing device 500 comprising a CPU 501, a RAM 502, a nonvolatile memory 503 (NVM), a crypto module 504, an analog module 506, an input/output interface 507, and a hardware-random number generator 512.

In this example, the CPU 501 has access to at least one crypto module 504 over a shared bus 505, to which each crypto module 504 is coupled. Each crypto module 504 may, in particular, comprise one or more crypto cores to perform certain cryptographic operations. Exemplary crypto cores are:

an AES core 509, a SHA core 510, an ECC core 511, and a lattice-based crypto core 508.

The CPU 501, the hardware random number generator 512, the NVM 503, the crypto module 504, the RAM 502, and the input/output interface 507 are connected to the bus 505. The input-output interface 507 may have a connection to other devices, which may be similar to the processing device 500.

The crypto module 504 may or may not be equipped with hardware-based security features.

The bus 505 itself may be masked or plain. Instructions to process the steps described herein may, in particular, be stored in the NVM 503 and processed by the CPU 505. The data processed may be stored in the NVM 503 or the RAM 502.

Supporting functions may be provided by the crypto module 504 (e.g., expansion of pseudo-random data).

Steps of the method described herein may exclusively or at least partially be conducted on the crypto module 504, e.g., on the lattice-based crypto core 508.

The processing device 500 may be a chip card powered by direct electrical contact or through an electromagnetic field. The processing device 500 may be a fixed circuit or based on reconfigurable hardware (e.g., Field Programmable Gate Array, FPGA). The processing device 500 may be coupled to a personal computer, microcontroller, FPGA, or smartphone.

The solution described herein may be used by a customer who intends to provide a secure implementation of lattice-based cryptography on a smart card or any secure element.

Figure 4:
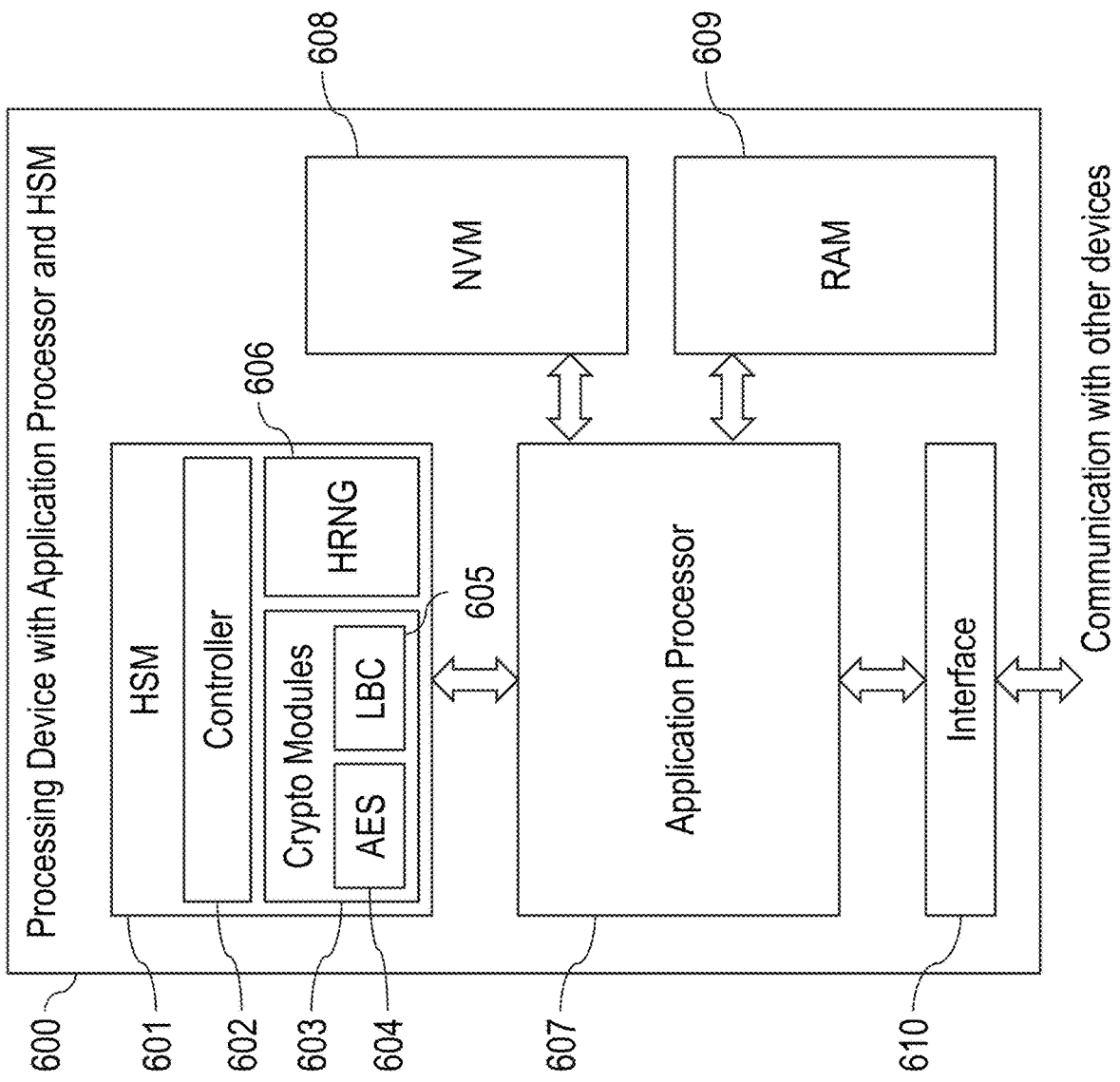
FIG. 4 shows an alternative arrangement with a hardware security module (HSM).

FIG. 4 shows another example of a processing device 600. The processing device 600 comprises a hardware security module 601, a non-volatile memory (NVM) 606, a random access memory (RAM) 609, an interface 610 for communication with other devices, and an application processor 607, which is coupled with the hardware security module (HSM) 601, the RAM 609, the NVM 608 and the interface 610.

The HSM 601 comprises a controller 602, a hardware-random number generator (HRNG) 606, and at least one crypto module 603. The crypto module 603 exemplary comprises an AES core 604 and a lattice-based crypto (LBC) core 605.

According to one embodiment, the HSM 601 and the application processor 607 may be fabricated on the same physical chip with a tight coupling. The HSM 601 delivers cryptographic services and secured key storage while the application processor may perform computationally intensive tasks (e.g., image recognition, communication, motor control). The HSM 601 may be only accessible by a defined interface and considered independent of the rest of the system in a way that a security compromise of the application processor 607 has only a limited impact on the security of the HSM 601. The HSM 601 may perform all tasks or a subset of tasks described with respect to the processing device 600 by using the controller 602, the LBC 605, supported by, exemplary, an AES 604, and the HRNG 606. It may execute the procedures described herein (at least partially) either controlled by an internal controller or as a CMOS circuit. Moreover, the application processor 607 may perform the procedures described herein (at least partially, e.g., in collaboration with the HSM 601).

The processing device 600 with this application processor 607 and HSM 601 may be used as a central communication gateway or (electric) motor control unit in cars or other vehicles.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media, including any medium that facilitates the transfer of a computer program from one place to another, e.g., according to a communication protocol. In this manner, computer-readable media generally may correspond to (1) tangible computer-readable storage media, which is non-transitory, or (2) a communication medium such as a signal or carrier wave. Data storage media may be any available media that can be accessed by one or more computers or one or more processors to retrieve instructions, code, and/or data structures for the implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media but are instead directed to non-transient, tangible storage media. Disk and disc, as used herein, includes compact disc (CD), laser disc, optical disc, digital versatile disc (DVD), floppy disk, and Blu-ray disc, where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein, may refer to any of the foregoing structures or any other structure suitable for the implementation of the techniques described herein. In addition, in some aspects, the functionality described herein may be provided within dedicated hardware and/or software modules configured for encoding and decoding or incorporated in a combined codec. Also, the techniques could be fully implemented in one or more circuits or logic elements.

The techniques of this disclosure may be implemented in a wide variety of devices or apparatuses, including a wireless handset, an integrated circuit (IC), or a set of ICs (e.g., a chipset). Various components, modules, or units are described in this disclosure to emphasize functional aspects of devices configured to perform the disclosed techniques but do not necessarily require realization by different hardware units. Rather, as described above, various units may be combined in a single hardware unit or provided by a collection of interoperative hardware units, including one or more processors as described above, in conjunction with suitable software and/or firmware.

Although various exemplary embodiments of the invention have been disclosed, it will be apparent to those skilled in the art that various changes and modifications can be made that will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results.

Such modifications to the inventive concept are intended to be covered by the appended claims.

REFERENCES

[LDK+21] Vadim Lyubashevsky, LéDucas, Eike Kiltz, Tancréde Lepoint, Peter Schwabe, Gregor Seiler, and Damien Stehlé. CRYSTALS—Dilithium: Algorithm specification and supporting documentation (version 3.1). Submission to the NIST Post-Quantum Cryptography Standardization Project [NIS16], 2021. Specification Document:https://pq-crystals.org/dilithium/data/dilithium-specification-round3-20210208.pdf. Website: https://pq-crystals.org/dilithium.

[NIS16] NIST Computer Security Division. Post-Quantum Cryptography Standardization, 2016. Website: https://csrc.nist.gov/Projects/Post-Quantum-Cryptography.

What is claimed is:

1. A method for generating a lattice-based signature comprising:
    determining an uncorrected signature;
    determining hints based on a verification of the uncorrected signature, wherein the verification is based on a first portion of an uncompressed public key element, wherein a second portion of the uncompressed public key element is not used during signature generation, and wherein effects resulting from omitting the second portion are determined in a backward direction without using the second portion; and
    providing the uncorrected signature and the hints as the lattice-based signature, wherein a compression function is at least partly conducted on a security device, a secured cloud, a secured service, an integrated circuit, a hardware security module, a trusted platform module, a crypto unit, a field programmable gate array (FPGA), a processing unit, a controller, or a smartcard.

2. The method according to claim 1, wherein the lattice-based signature generation is based on or interworks with lattice-based digital signature scheme Dilithium.

3. The method according to claim 1, wherein the second portion of the uncompressed public key element is longer than the first portion of the uncompressed public key element.

4. The method according to claim 1, wherein the second portion of the uncompressed public key element is not stored locally.

5. The method according to claim 1, wherein the second portion of the uncompressed public key element is not made publicly available.

6. The method according to claim 1, wherein the verification is used to determine whether a fault has occurred during the generation of the lattice-based signature.

7. A non-transitory computer program product directly loadable into a memory of a digital processing device, comprising software code portions for performing the steps of the method of claim 1.

8. A device for generating a lattice-based signature, wherein the device is arranged to:
    determine an uncorrected signature;
    determine hints based on a verification of the uncorrected signature, wherein the verification is based on a first portion of an uncompressed public key element, wherein a second portion of the uncompressed public key element is not used during signature generation, and wherein effects resulting from omitting the second portion are determined in a backward direction without using the second portion; and
    providing the uncorrected signature and the hints as the lattice-based signature,
    wherein a compression function is at least partly conducted on a security device, a secured cloud, a secured service, an integrated circuit, a hardware security module, a trusted platform module, a crypto unit, a field programmable gate array (FPGA), a processing unit, a controller, or a smartcard.

* * * * *